(12) United States Patent
Kurzion et al.

(10) Patent No.: US 10,061,850 B1
(45) Date of Patent: Aug. 28, 2018

(54) USING RECENT QUERIES FOR INSERTING RELEVANT SEARCH RESULTS FOR NAVIGATIONAL QUERIES

(75) Inventors: Yair Kurzion, Mountain View, CA (US); Matthew Kulick, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 12/844,744

(22) Filed: Jul. 27, 2010

(51) Int. Cl.
G06F 17/30 (2006.01)

(52) U.S. Cl.
CPC .............................. G06F 17/30864 (2013.01)

(58) Field of Classification Search
CPC ................................................. G06F 17/30864
USPC ............... 707/616, 706–723, 731, 732, 735, 707/748–755, 759, 775, 779–780, 769, 707/999.1
See application file for complete search history.

(56) References Cited

U.S. PATENT DOCUMENTS

| | | | |
|---|---|---|---|
| 7,657,515 B1 * | 2/2010 | Jewell ..................... | 707/999.003 |
| 2002/0035611 A1 * | 3/2002 | Dooley ............. | G06F 17/30864 709/218 |
| 2002/0059258 A1 * | 5/2002 | Kirkpatrick ................... | 707/100 |
| 2007/0198489 A1 * | 8/2007 | Li et al. ............................ | 707/3 |
| 2007/0203890 A1 * | 8/2007 | Sareen .............. | G06F 17/30902 |
| 2007/0244900 A1 * | 10/2007 | Hopkins ........... | G06F 17/30873 |
| 2009/0119263 A1 * | 5/2009 | Jones .............. | G06F 17/30864 |
| 2009/0187515 A1 * | 7/2009 | Andrew et al. ................. | 706/12 |
| 2009/0240569 A1 * | 9/2009 | Ramer et al. .................... | 705/10 |
| 2009/0327224 A1 * | 12/2009 | White ............... | G06F 17/30864 |
| 2010/0131902 A1 * | 5/2010 | Teran et al. .................... | 715/843 |
| 2010/0153427 A1 * | 6/2010 | Schechter ......... | G06F 17/30864 707/768 |
| 2010/0306241 A1 * | 12/2010 | Hentrich et al. .............. | 707/769 |
| 2010/0332508 A1 * | 12/2010 | Gustafson .............. | G06Q 30/02 707/759 |
| 2011/0022582 A1 * | 1/2011 | Unnikrishnan et al. ...... | 707/715 |
| 2011/0047149 A1 * | 2/2011 | Vaananen ...................... | 707/723 |
| 2011/0060717 A1 * | 3/2011 | Forman ............. | G06F 17/30867 706/54 |

* cited by examiner

*Primary Examiner* — Syling Yen
(74) *Attorney, Agent, or Firm* — Brake Hughes Bellermann LLP

(57) ABSTRACT

A method and system for using recent search queries for inserting relevant search results for navigational queries. At a server, multiple first queries including one or more search terms are received from a first user of a client. At least a subset of the first queries is stored in memory. A navigational query is received from the first user. The navigational query includes a first identifier of a first web site. An alternate query including one or more of the search terms is performed at the server. The search results for the alternate query are transmitted to the client for display to the first user.

26 Claims, 10 Drawing Sheets

USING RECENT QUERIES FOR INSERTING RELEVANT SEARCH RESULTS FOR NAVIGATIONAL QUERIES

TECHNICAL FIELD

The disclosed embodiments relate generally to search results for navigational queries. In particular, the disclosed embodiments relate to a system and method for using recent search queries for inserting relevant search results for navigational queries.

BACKGROUND

Online search engines such as Google®, Yahoo! Alta Vista, and the like are used by many Internet users to search for a variety of items. The searched items may include books, media content (e.g., audio and video content), documents, and other products or services such as accounting, tourism, car rental, air travel, hotels, restaurants, and the like. Some of the items are available online from various e-commerce web sites. For example, a large number of items are offered for sale at web sites such as Amazon.com, eBay.com, Travelzoo.com, Dell.com, and so forth.

Users may search for items of interest directly from these web sites. For instance, a user interested in purchasing or obtaining information related to a particular laptop computer can navigate to the Amazon.com or Dell.com web site and search for the laptop using whatever search tools are provided by the respective site. One drawback of this approach is that users will need to adapt to the possibly limited capabilities of an on-site search engine to find the desired item(s).

Also, many users may not know exactly what model or brand they want to purchase, or even the URL of a web site from which to make their purchase. Such users might first perform one or more informational searches where they enter various laptop models or manufacturer names into a general-purpose search engine (such as the Google® search engine) to see what particular choices are available. They then might perform a navigational search by entering in their chosen search engine the name of a shopping site (such as "Amazon" or "Dell"), hoping that one of the top results will provide a link to the corresponding site (such as "http://www.amazon.com" or "http://www.dell.com"). After selecting a link from the navigation search results and landing on the desired web-site, these users would then need to enter the product names of interest from the first set of search results into the on-site search engine to continue with their shopping. In addition to requiring users to employ multiple search engines, possibly with different interfaces and capabilities, this is an inefficient process as it requires users to perform multiple, possibly redundant, searches from the different search engines. Also, it might be the case that products identified in the first information searches are not available on the shopping site selected from the navigational search results. Therefore, it would be desirable to provide users who might have limited information about web site URLs and particular products available on those sites with a more efficient and consistent searching and shopping experience.

BRIEF DESCRIPTION OF THE DRAWINGS

Like reference numerals refer to corresponding parts throughout the drawings.

SUMMARY

Figure 1:
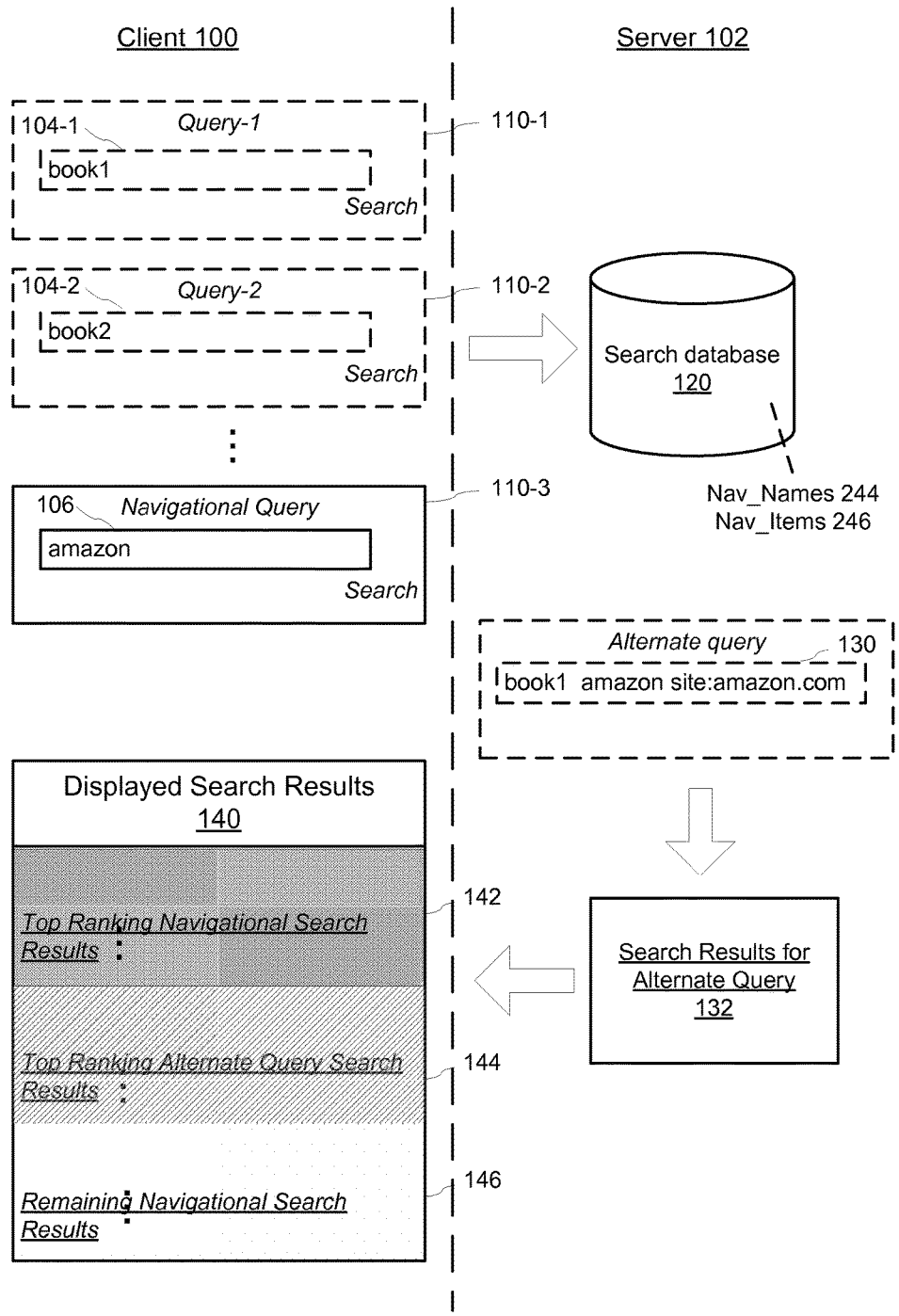
FIG. 1 is a block diagram illustrating an online session where recent search queries are used to supplement search results for navigational queries, according to some embodiments.

Some embodiments provide a system, a computer-readable storage medium including instructions, and a computer-implemented method for using recent search queries for inserting relevant search results for navigational queries. At a server, one or more first queries, each including one or more search terms are received from a first user of a client. At least a subset of the first queries is stored in memory. A navigational query is received from the first user. The navigational query includes a first identifier of a first web site. An alternate query including one or more of the search terms and the navigational query is performed at the server. The search results for the alternate query are transmitted to the client for display to the first user. The performing of the alternate query is based on a prediction by the server, using the recent search queries (e.g., the multiple first queries) received from the first user, of items the first user may intend to search for on the first web site.

In some embodiments, the first queries may include queries received from the user within a predefined period of time or queries from the most recent N queries received from the first user, where N is a predefined number (e.g., a number between one and five). In some embodiments, the server determines that items referenced by the first queries are associated with the first website. The server subsequently performs the navigational query received from the first user to obtain navigational search results. The navigational search results are merged with the alternate search results to form merged search results. The merged search results are subsequently transmitted to the client for display to the first user.

In some embodiments, the client receives the merged search results from the server. In some embodiments, the merged search results include top ranking navigational search results, top ranking alternate search results, and remaining navigational search results. The client displays these search results in different displayed positions in a displayed search result page, as described in detail below.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set fourth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

FIG. 1 is a block diagram illustrating an online session where recent search queries are used to supplement search results for navigational queries, according to some embodiments. At a client system 100 (also referred to hereinafter as a "client"), a user in an online session enters one or more search queries 104, including search terms such as "book1" 104-1 and "book2" 104-2, in the search window 110 of a browser or another program that provides search capabilities. The server system 102 (also referred to hereinafter as a "server") receives the user's search queries and in some embodiments stores the queries or a subset of the queries (e.g., the search terms) in a search database 120 for later reference. The server system 102 also returns search results for the respective search queries 104. In some embodiments, the stored search terms can be associated with a particular user id or a user session. Note that in such an embodiment, the user id could be in anonymized form; that is, not associated with an actual identity of the user. In other embodiments the user id may not be anonymized.

Subsequently, the user enters a navigational query 106 in the search window 110. For the purposes of this patent application, a navigational query is a query that includes an identifier or other term that is clearly associated with a particular web site, such as the web site's name. For example, "Google," "Amazon" and "HP" are examples of navigational queries for the respective web sites, "google.com," "amazon.com," and "hp.com." Navigational queries also include multi-word identifications of a site, such as "bed bath and beyond;" misspelled site identifications where the intended site is apparent, such as "wolmart" instead of "walmart;" and shorthand notations for web sites, such as the query "today," used by many users as short hand for, "today show," with the corresponding expected site being, "today.msnbc.msn.com." The server 102 receives the navigational search query 106 and performs the navigational search to obtain navigational search results. In some embodiments, as described below, the server 102 maintains a Nav_Name database 244 of search terms associated with navigational queries in order to determine when the user has issued such a navigational search query. Instead of merely transmitting the navigational search results to the user, the server 102 uses its record of the user's recent search queries, such as the search queries 104-1 and 104-2 to predict what items (e.g., items corresponding to at least a subset of the recent search queries) the user might want to search for on the site associated with the navigational query 106. In some embodiments, the server 102 consults a list of items/search terms that have been selected/clicked through on search results for specific sites (e.g., sites on the Nav_Item lists 246) to determine which of the recent search results have been selected by previous users from previous search results for the same navigational query 106. The server 102 then performs an additional alternate query based on that prediction. Note that the term, "items" as used herein includes search terms entered into search queries and displayed in search results, and can also refer to items on web sites, which, as mentioned above, can include media, documents, commercial products of any kind, or information of any type that can be related to search results for particular web sites.

In some embodiments, the server 102 assumes that the user may want to submit at least one of the recent search queries 104 to the web site associated with the navigational query 106. In order to save the user the time and effort required to re-enter such search terms 104 into that site's internal search engine, the server 102 internally prepares an alternate query 130 that includes the navigational search query 106 and one or more search terms from the user's recent search queries (e.g., the search queries 104). The server 102 then performs the alternate query 130 and obtains alternate query search results 132.

For example, the user may search for "Harry Potter" (e.g., as "book1" in the search query 104-1) in the search engine and then subsequently enter a navigational search query for "amazon." In this example, the alternate search query internally performed by the server 102 (i.e., the Google server) would include the search term, "Harry Potter," and the navigational query, "amazon" and would be restricted to the "amazon.com" site. In some embodiments, as shown in FIG. 1, the alternate search query performed by the server 102 would correspond to the string: "harry potter amazon site:amazon.com." With this search query, the terms "harry potter" and "amazon" would be highlighted in the search results from the amazon.com site. In other embodiments, the alternate search query performed by the server 102 could correspond to the string: "harry potter site:amazon.com." With this search query, only the term "harry potter" would be highlighted in the search results from the amazon.com site.

In some embodiments, each of the navigational search results and the alternate query search results 132 include multiple search results. These search results, as will be described in more detail below, are ranked by the server 102 to identify top ranking search results. In some embodiments, each of the top ranking navigational search results, the top ranking alternate search results, and the remaining navigational search results are associated with a priority attribute that indicates a priority level for display or other purposes. For example, in some embodiments, the top ranking navigational search results, the top ranking alternate search results, and the remaining navigational search results can have associated first, second, and third priority attributes, respectively, where the first, second, and third priority attributes correspond to the highest, medium, and lowest priority levels, respectively.

In some embodiments, the server 102 merges the top ranking navigational search results, the top ranking alternate search results, and the remaining navigational search results, with their associated priority attributes, and transmits the merged search results to the client 100 for display to the user. The client 100 receives the merged search results and displays them according to their respective priority level in different displayed locations. For example, in some embodiments, the client 100 displays the top ranking navigational search results, the top ranking alternate search results, and the remaining navigational search results, respectively, at displayed positions 142, 144, and 146 of the displayed search results 140 in a browser window.

Figure 2:
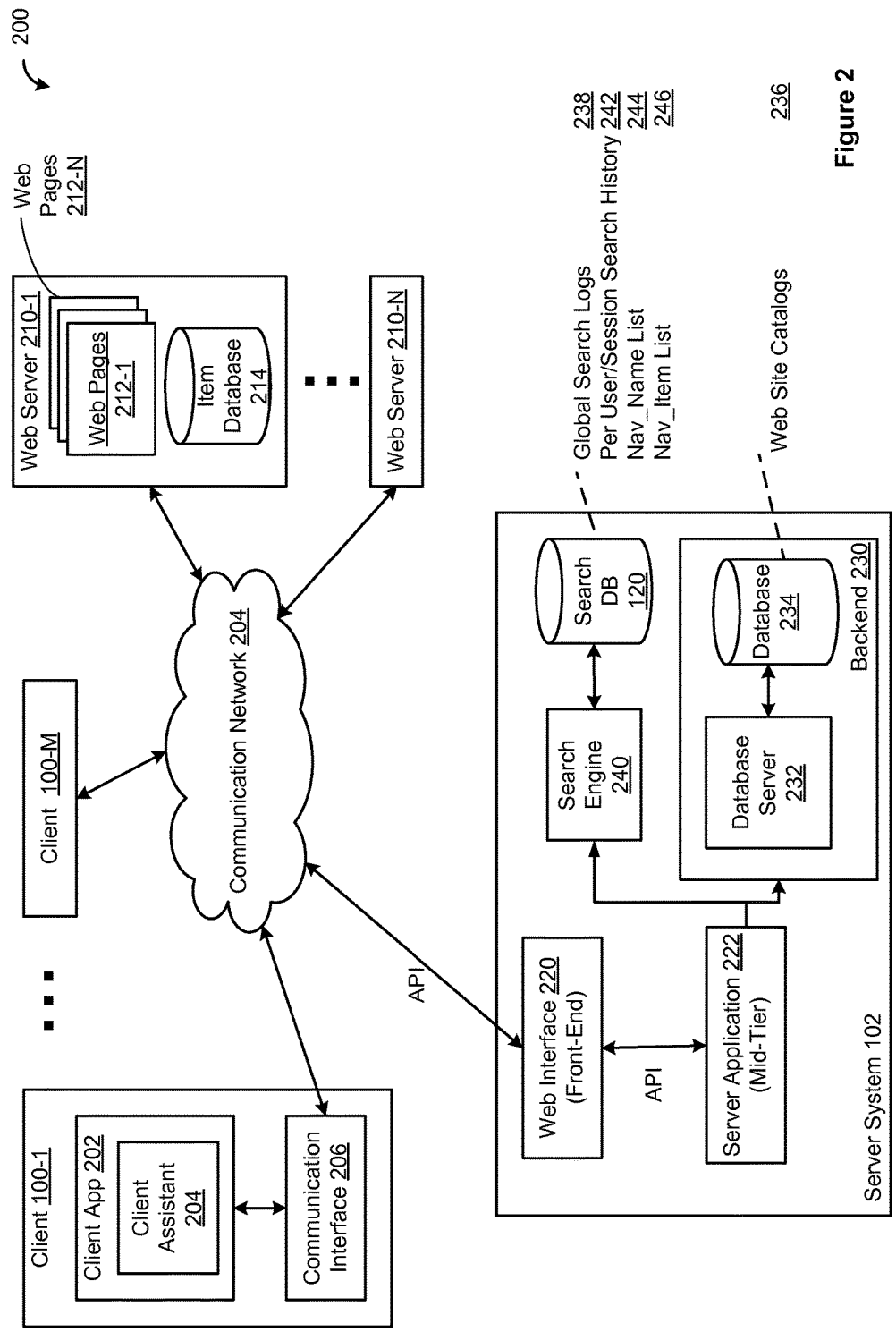
FIG. 2 is a block diagram of a client-server system for using recent search queries to supplement search results for navigational queries, according to some embodiments.

FIG. 2 is a block diagram of a client-server system 200 for using recent search queries to supplement search results for navigational queries, according to some embodiments. The client-server system 200 includes a number of clients 100 (e.g., clients 100-1 to 100-M) connected to a server 102 through one or more communication networks 204. A client 100 may be any computer or similar device through which a user of the client 100 can submit data access requests (e.g., search queries) to and receive results (e.g., search results) or other services from the server 102 and/or web servers 210. Examples include, without limitation, desktop computers, laptop computers, tablet computers, mobile devices such as mobile phones, personal digital assistants, set-top boxes, or any combination of the above. A respective client 100 may contain at least one client application 202 for submitting requests to the server 102 and/or the web servers 210. For example, the client application 202 can be web applications such as web browser or other type of application that permits a user to access the services provided by the server 102 and/or the web servers 210.

In some embodiments, the client application 202 includes one or more client assistants 204. A client assistant 204 can be a software application that performs tasks related to assisting a user's activities with respect to the client application 202 and/or other applications. For example, the client assistant 204 may assist a user at the client 100 with browsing information (e.g., web pages retrieved from the web servers 210), processing information (e.g., query results) received from the server 102, and monitoring the user's activities on the query results. In some embodiments, the client assistant 204 is embedded in a web page (e.g., a query results web page) or other documents downloaded from the server 102. In some embodiments, the client assistant 204 is a part of the client application 202 (e.g., a plug-in application of a web browser). The client 100 further includes a communication interface 206 to support the communication between the client 100 and other systems/devices (e.g., the server 102, web server 210, or another client device 100).

The communication network(s) 204 can be any wired or wireless local area network (LAN) and/or wide area network (WAN), such as an intranet, an extranet, the Internet, or a combination of such networks. In some embodiments, the communication network 204 uses the HyperText Transport Protocol (HTTP) and the Transmission Control Protocol/Internet Protocol (TCP/IP) to transport information between different networks. The HTTP permits client devices to access various information items available on the Internet via the communication network 204. The various embodiments of the invention, however, are not limited to the use of any particular protocol.

In some embodiments, the server 102 includes a web interface 220 (also referred to as a "front-end server"), a server application 222 (also referred to as a "mid-tier server"), and a backend server 230. The web interface 220 receives data access requests from clients 100 and forwards the requests to the server application 222. In response to receiving the requests, the server application 222 decides how to process the requests. In some embodiments, the server application 222 optionally pre-processes the request (e.g., one or more search queries including search strings) to identify data filters associated with a request and search terms embedded in each of the search strings. The server application 222 submits the pre-processed request to a search engine 240. The search engine 240 stores search strings and/or the identified search terms in a history file 242 of search queries of a search database 120.

In some embodiments, the search engine 240 builds a list 244 of navigational queries (e.g., the Nav_Name list 244) and stores the list in the search database 120 where it can be accessed by the search engine 240. In some embodiments, the search engine 240 builds the list of navigational queries by scanning the queries in global search logs 238 (FIG. 6) and identifying as navigational queries those search queries "X" where the most common click (i.e., selected result) in the search results is for a web site named X. For example, the server 102 can identify the search term, "google," as a navigational query by examining users' clicks in search results for the query, "google" and determining that some predetermined percentage (e.g., more than 60%) of the resulting clicks in the search results are for the "google.com" web site. The search engine then stores the navigation query ("X") and the associated web site URL (X) as a pair in the list of navigational queries 244. In some embodiments, there can be more than navigational query ("X1" and "X2") associated with a particular web site (X). For example, both "google" and "google.com" could be navigational queries associated with the google.com site.

In some embodiments, the search engine 240 builds a list 246 of items associated with each navigational query in the Nav_Name list 244 (e.g., the Nav_Item list 246). The search engine 240 builds the Nav_Item list of items 246 by scanning the search logs 242 and identifying queries from various users with the strings "X Y" or "Y X", where X represents a navigational query and Y represents a sequence of one or more search terms. After finding such queries, the search engine 240 then identifies, among the found queries, those queries for which the majority of clicks were on a web site named X. The search terms included in the sequence of search terms Y, are then identified as referencing items associated with the web site named X. The search engine 240 then stores the identified queries and associated items Y in the navigation items list 246, which, in some embodiments, is stored in the database 120. Many of the examples discussed herein are related to commercial web sites, such as online stores, where the Nav_Items are commercial products available from those sites. However, Nav_Names and Nav_Items can be used in a wide range of applications. For example, the Nav_Name, "you tube" can have associated Nav_Items, "hip hop" or "cats" (returning youtube results for hip hop and cat videos, respectively). Other exemplary Nav_Name/Nav_Item pairs include: Nav_Name="irs"/Nav_Item="form 1040," and Nav_Name=wikipedia/Nav_Name="roman empire." In some embodiments, a server 102 can use the Nav_Name and Nav_Item lists 244, 246 to suggest multiple Nav_Names for a given Nav_Item (entered, for example, by a user in a search window on a client 100) even though the user entered just one Nav_Name. For example, if the user types the queries: 1) "harry potter," and 2) "amazon," a server 102 could also return suggestions that the user search for "harry potter" on the following Nav_Names: "walmart," "imdb," "target" and "youtube," because all of those Nav_Names have "harry potter" as an associated Nav_Item. In other embodiments, the server 102 could trigger such a suggestion only when the user enters more than one Nav_Name matching a Nav_item used in their session. For example, if a user entered the query sequence: 1) "titanic," 2) "wikipedia," and 3) "history channel," a server 102 could return a list of all of the Nav_Names that have "titanic" as a Nav_Item because both "wikipedia' and "history channel" have "titanic" as a Nav_Item.

In some embodiments, the search database 120 is stored at the server 102. In some embodiments, the search database 120 is a distributed database. In some embodiments, the search database 120 is located on a computer system that is separate and distinct from the server 102. In some embodiments, the distributed database is a multi-dimensional sorted map. For example, the multi-dimensional sorted map may be implemented as a BigTable database.

In some embodiments, the backend 230 is a database management system including a database server 232 that is configured to manage a database 234. For example, the backend 230 receives and processes queries from the server application 222. The queries can be associated with a request made by one of the clients 100 or a server-based application. In response to such a request the server application 222 determines whether it has data that is responsive to the request, submits queries to the backend 230, processes the data returned by the backend server 230 in response to the queries, and returns the processed data as results to the requesting clients 100. After receiving the results, the client application 202 at a respective client 100 displays the result to the user who submitted the original request.

In some embodiments, the database 234 is stored at the server 102. In some embodiments, the database 234 is located on a computer system that is separate and distinct from the server 102. In some embodiments, the database 324 is a distributed database. In some embodiments, the distributed database is a multi-dimensional sorted map. For example, the multi-dimensional sorted map may be implemented as a BigTable database.

For some sites, the list of associated Nav_Item entries can be very large. For example, a very large e-commerce site (such as "amazon.com") can have as many as one million Nav_Items associated with the site's Nav_Name. For such sites, when sending the site's Nav_Name to the server (e.g., the database 120,) and requesting a list of Nav_Items for that Nav_Name, returning the list of Nav_Items (for example, from the database 120 to the search program 240) can be very slow. To avoid such delay, some embodiments test for the existence of a (Nav_Name, Nav_Item) pair in a map, avoiding the need to retrieve in one operation all Nav_Items that match a specific Nav_Name entry.

In some embodiments, the web server 210 that provides web pages 212 stores lists of items available from various web sites as web site catalogs 236 in the item database 214. The web site catalogs can be provided, upon request, to the server 102. Once requested and received by the server 102, the web site catalogs can be stored in a website catalog file 236 associated in some embodiments with the database 234. In some embodiments, these catalogs can be used by the server to confirm that items of interest to a user are available at web sites associated with the user's navigational searches.

Figure 3:
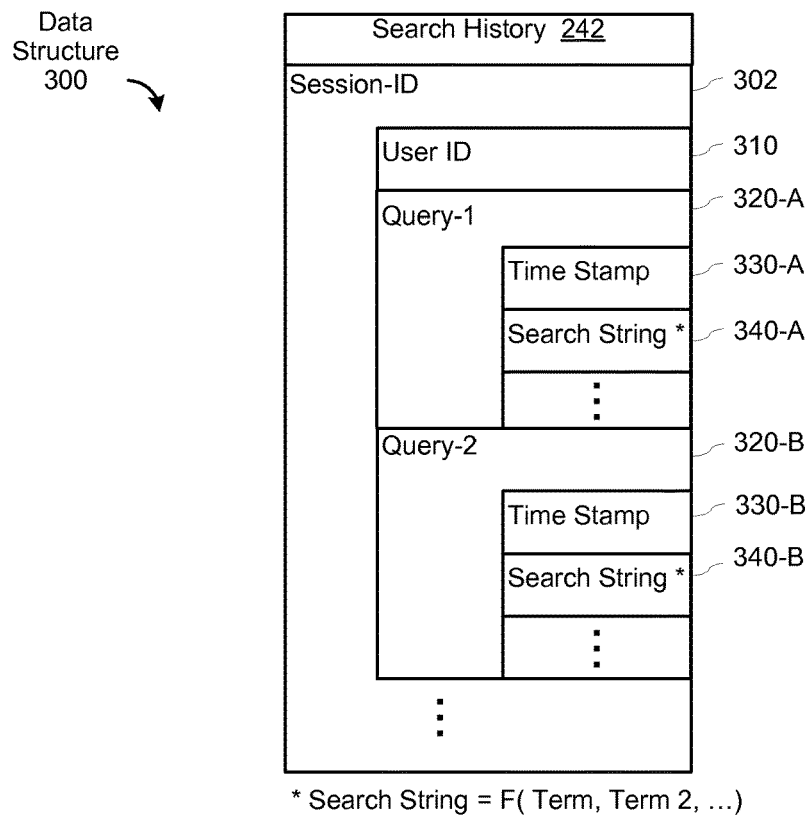
FIG. 3 is a block diagram of an exemplary data structure used for storing history files of search queries, according to some embodiments.

FIG. 3 is a block diagram of an exemplary data structure 300 used to store per-user and/or per-session search histories in some embodiments. The session data stored in the history files 242 of search queries correspond to an online session (e.g., the online session described above with respect to FIG. 1) of a user of the client 100 (FIG. 1) using a browser application and issuing search queries to a search engine 240. The server 102 (FIG. 2) associates with each online session a session-ID 302, which is stored in the data structure 300. In some embodiments, information stored for each session includes a user (or computer) ID 310 that identifies a user (or computer) of the client 100 who initiated the online session and information 320 on queries issued by the user during that session. In some embodiments, the session-ID 302 and the user ID 310 may be derived from information provided by the client, such as information stored in a cookie received from a client web browser. The cookie may also be stored in the client 100 and transmitted by the browser to the server 102 when the online session is initiated by the user.

In some embodiments, other information stored for a session 302 includes a time stamp 330 that indicates when the server received a particular query 320 from the user, and the search string 340 associated with that query. In some embodiments, each search query 340 is a logical function F(term1, term2 . . . ) of search terms, term1, term2, . . . , where the logical function F( ) represents a filtering function applied to the search terms, term1, term2, . . . , by the user. In some embodiments, the filtering function is a combination, subset or superset of Boolean operators, such as AND, OR and NOT; and restriction operators that, for example, specify that the search be limited to a particular site or result date range. Optionally, the server application 222 may pre-process a search string 340 to identify search terms associated with a search query 320, and submit these search terms to the search engine 240 for storing in the search database 120.

Figure 4A:
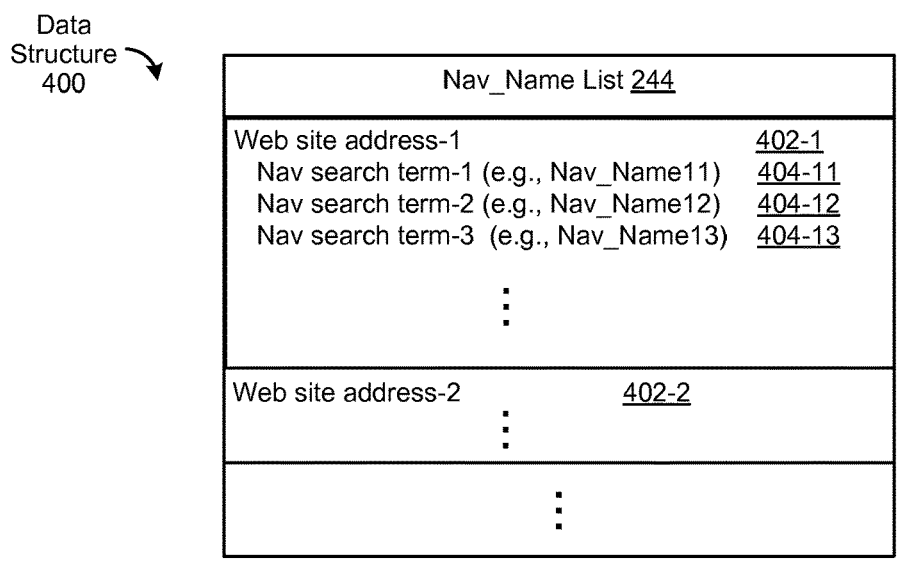
FIGS. 4A and 4B are exemplary data structures used for storing navigational query (Nav_Name) and item (Nav_Item) information, respectively, according to some embodiments.

FIG. 4A is a block diagram of an exemplary data structure 400 used to store navigational search terms and associated web site addresses (e.g., the Nav_Name list 244), according to some embodiments. The data structure includes for each of a collection of known web site addresses 402 one or more navigational search terms 404 that are associated with that web site. In some embodiments the Nav_Name list 244 entries are generated as described above, with reference to FIG. 2.

Figure 4B:
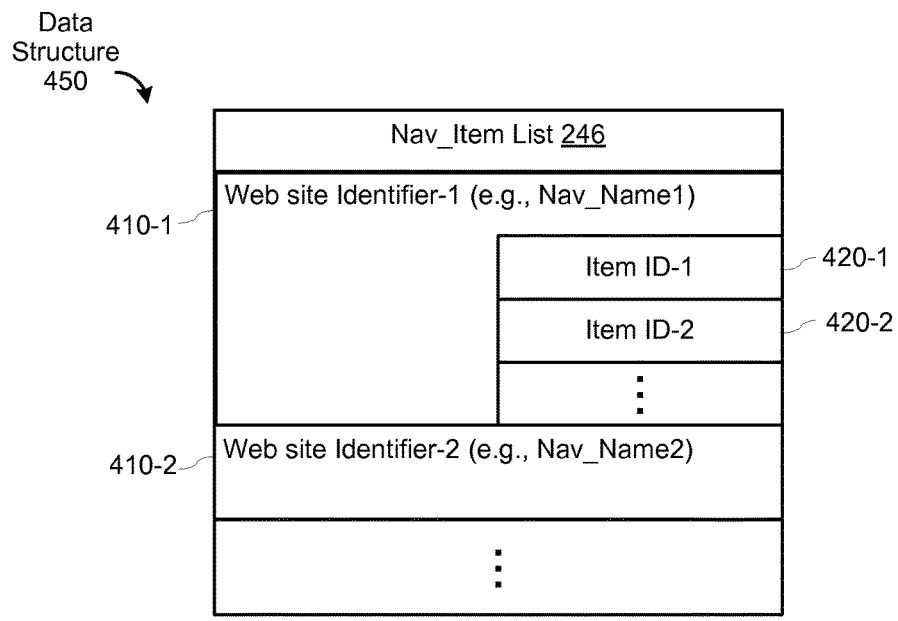

FIG. 4B is a block diagram of an exemplary data structure 450 used to store lists of items/search terms associated with particular sites from the Nav_Name list 244 (e.g., the Nav_Item list 246), according to some embodiments. The data structure 400 includes, for each web site identifier 410 (e.g., a web site name) corresponding to a navigational query a number of items 420 associated with the web site identified by that web site identifier. For example, in some embodiments, each item ID 420 represents an item associated with the web site identified by the web site identifier 410-1. In an alternative embodiment, the list of items 420 of the website 410 may be derived from a web site catalog for the web site identified by the web site identifier 410 received from a respective web server (e.g., web server 210, FIG. 2). In some embodiments, the web site identifier 410 corresponds to an address of a web site for which there is an entry in the Nav_Name list 242; in other embodiments the web site identifier 410 is an actual Nav_Name.

Figure 5:
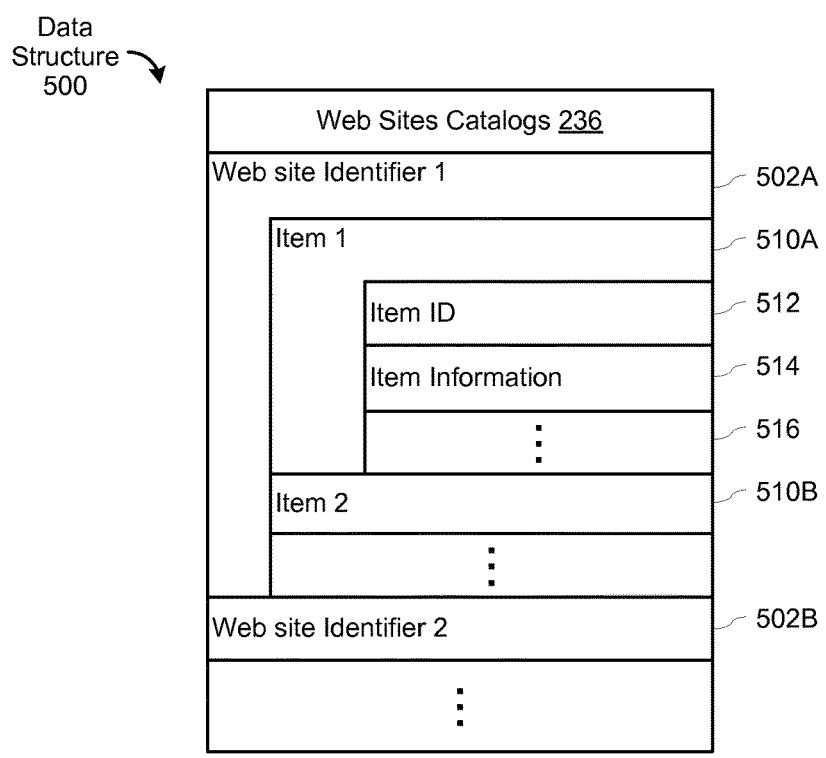
FIG. 5 is a block diagram of an exemplary data structure used for storing web sites catalogs, according to some embodiments.

FIG. 5 is a block diagram of an exemplary data structure 500 used for storing website catalogs 236, according to some embodiments. The arrangement of the data structure 500 is analogous to the data structure 450 of FIG. 4B, except that in the data structure 500, for each item 510 of a web site identified by a web site identifier 502; supplementary data, such as item information 514, in addition to item ID 512, are provided. The item information 514 may include images, specifications, a price, an expiration date, and the like.

Figure 6:
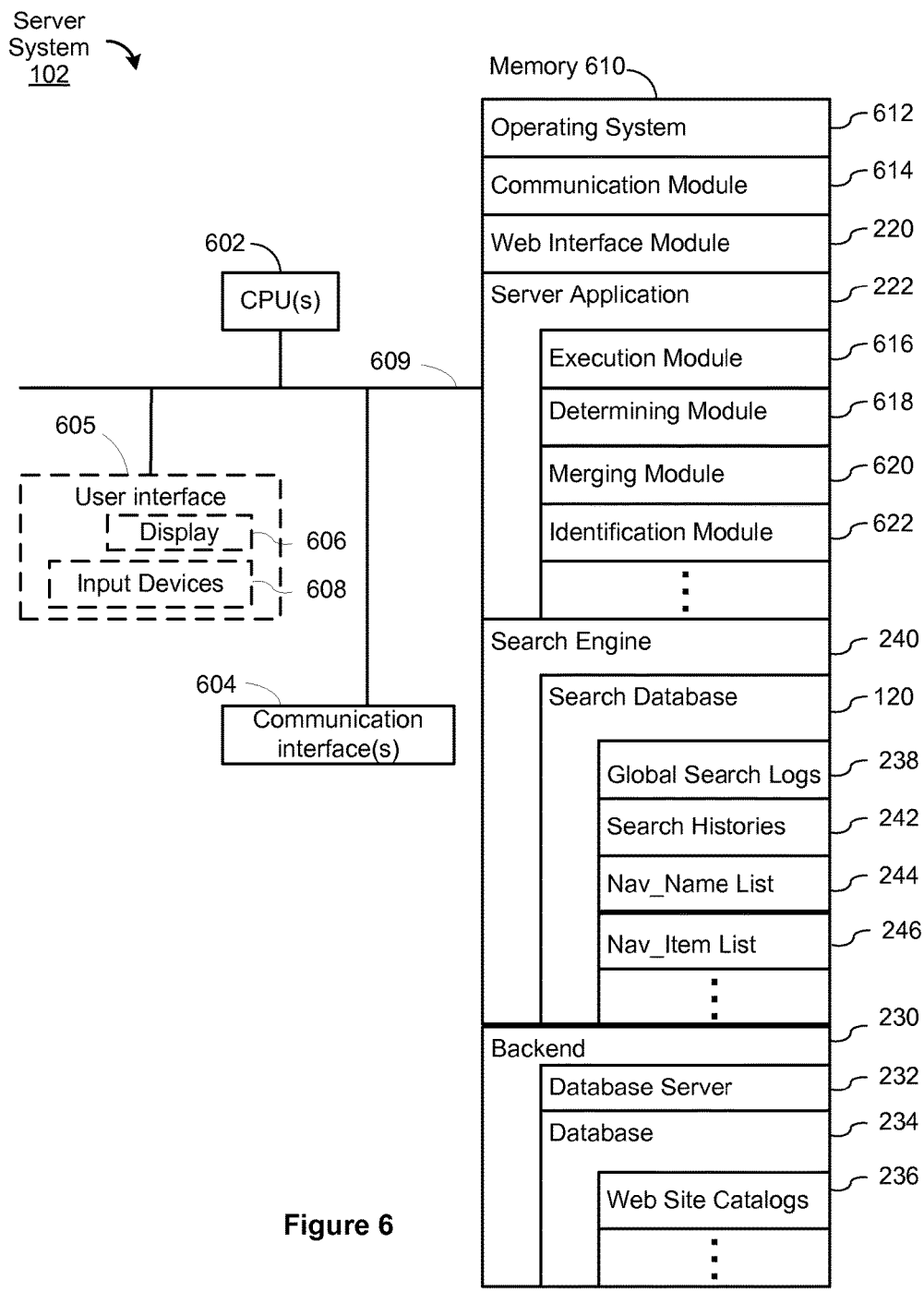
FIG. 6 is a block diagram of a server system for using recent search queries for inserting relevant search results for navigational queries, according to some embodiments.

FIG. 6 is a block diagram of a server 102 for using recent search queries for inserting relevant search results for navigational queries, according to some embodiments. The server 102 generally includes one or more processing units (CPU's) 602, one or more network or other communications interfaces 604, memory 610, and one or more communication buses 609 for interconnecting these components. The server 102 may optionally include a user interface 605 comprising a display device 606 (e.g., a touch sensitive display device) and input devices 608 (e.g., a keyboard, a mouse, a track pad, etc.). The communication buses 609 may include circuitry (sometimes called a chipset) that interconnects and controls communications between components. Memory 610 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 610 may optionally include one or more storage devices remotely located from the CPU(s) 602. Memory 610, or alternately the non-volatile memory device(s) within memory 610, comprises a computer readable storage medium. Memory 610 or the computer readable storage medium of memory 610 stores the following elements, or a subset of these elements, and may also include additional elements:

- an operating system 612 that includes procedures for handling various basic system services and for performing hardware dependent tasks;
- a communication module 614 that is used for connecting the server 102 to other computers such as the clients 102 and the web servers 210 (FIG. 2) via the communication network interfaces 604 (wired or wireless) and one or more communication networks, such as the Internet, other wide area networks, local area networks, metropolitan area networks, and so on;
- a web interface module 220 for receiving (using a receiving module) requests including search queries 104 and the navigation search query 106 (FIG. 1) from the client devices 100 and returning (using a transmitting module) search results in response to the client requests;
- a server application 222, including an execution module 616 for performing client requests including search queries and navigational search queries targeting at the search engine 240 (FIG. 2); a determining module 618 for determining that items referenced by the recent queries received from the client 100 are associated with the web site identified by the navigational query received from the client 100; a merging module 620 for merging the search results for the alternate query and the navigational search results to form merged search results to be transmitted the client 100 for display to the user; an identification module 622 for identifying each query received from the user or computer with a user or computer identification determined based on information (e.g., cookies) received from the client 100; a search engine 240 for receiving requests including search queries from the server application 222 and interacting with search database 120; and the search database 120 for storing global search logs 238, recent per session search history 242, Nav_Name list 244 and Nav_Item list 246 as described above with respect to FIGS. 3, 4A and 4B and
- a backend 230 including a database server 232 for accessing a database 234 and further performing as discussed above with respect to FIG. 2; and the database 234 for storing various data including web site catalogs 236 (FIG. 2).

Figure 7:
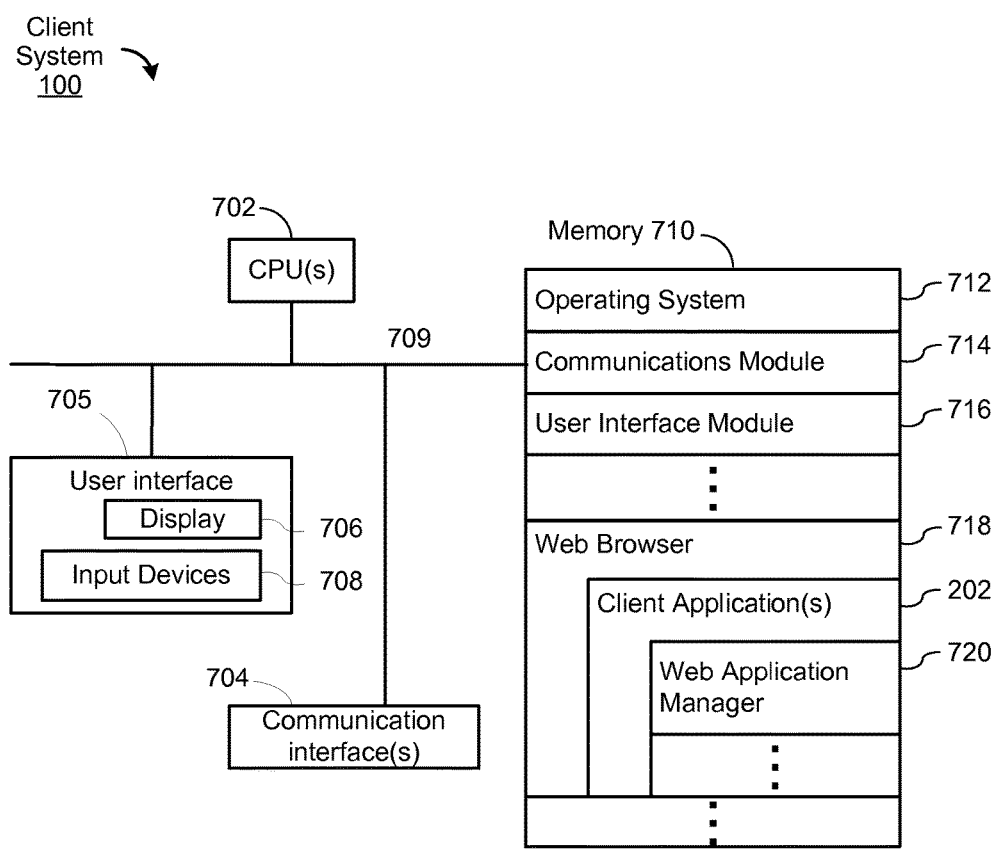
FIG. 7 is a block diagram of a client system for displaying relevant search results for navigational queries based on recent search queries, according to some embodiments.

FIG. 7 is a block diagram of a client 100 for displaying relevant search results for navigational queries based on recent search queries, according to some embodiments. The client device 100 generally includes one or more processing units (CPU's) 702, one or more network or other communications interfaces 704, memory 710, and one or more communication buses 709 for interconnecting these components. The client device 100 may optionally include a user interface 705, for instance, a display device 706, such as a touch sensitive display, input devices 708 (e.g., a keyboard, a mouse, a track pad, a touch-sensitive surface, etc.). The communication buses 709 may include circuitry (sometimes called a chipset) that interconnects and controls communications between components.

Memory 710 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 710 may include mass storage that is remotely located from the central processing unit(s) 702. Memory 710, or alternately the non-volatile memory device(s) within memory 710, comprises a computer readable storage medium. Memory 710 or the computer readable storage medium of memory 710 stores the following elements, or a subset of these elements, and may also include additional elements:

- an operating system 712 that includes procedures for handling various basic system services and for performing hardware dependent tasks;
- a communication module 714 that is used for connecting the client device 100 to other servers or computers including the server 102, and web servers 210, via one or more communication interfaces 704 (wired or wireless), and one or more communication networks such as the Internet, other wide area networks, local area networks, and metropolitan area networks and so on;
- a user interface module 716 for displaying search results including top ranking navigational search results and alternate query search results, as shown in FIG. 1, at different displayed positions of the display 706; and
- a web browser 718 (e.g., the client application 202), including a web application manager 720 (e.g., the client assistant 204) for managing the user interactions with the web browser 718. The web browser 718 or other application on the client is used in some embodiments to issue the search queries 104, 106 and to display the search results 140, as described with respect to FIG. 1.

Figure 8A:
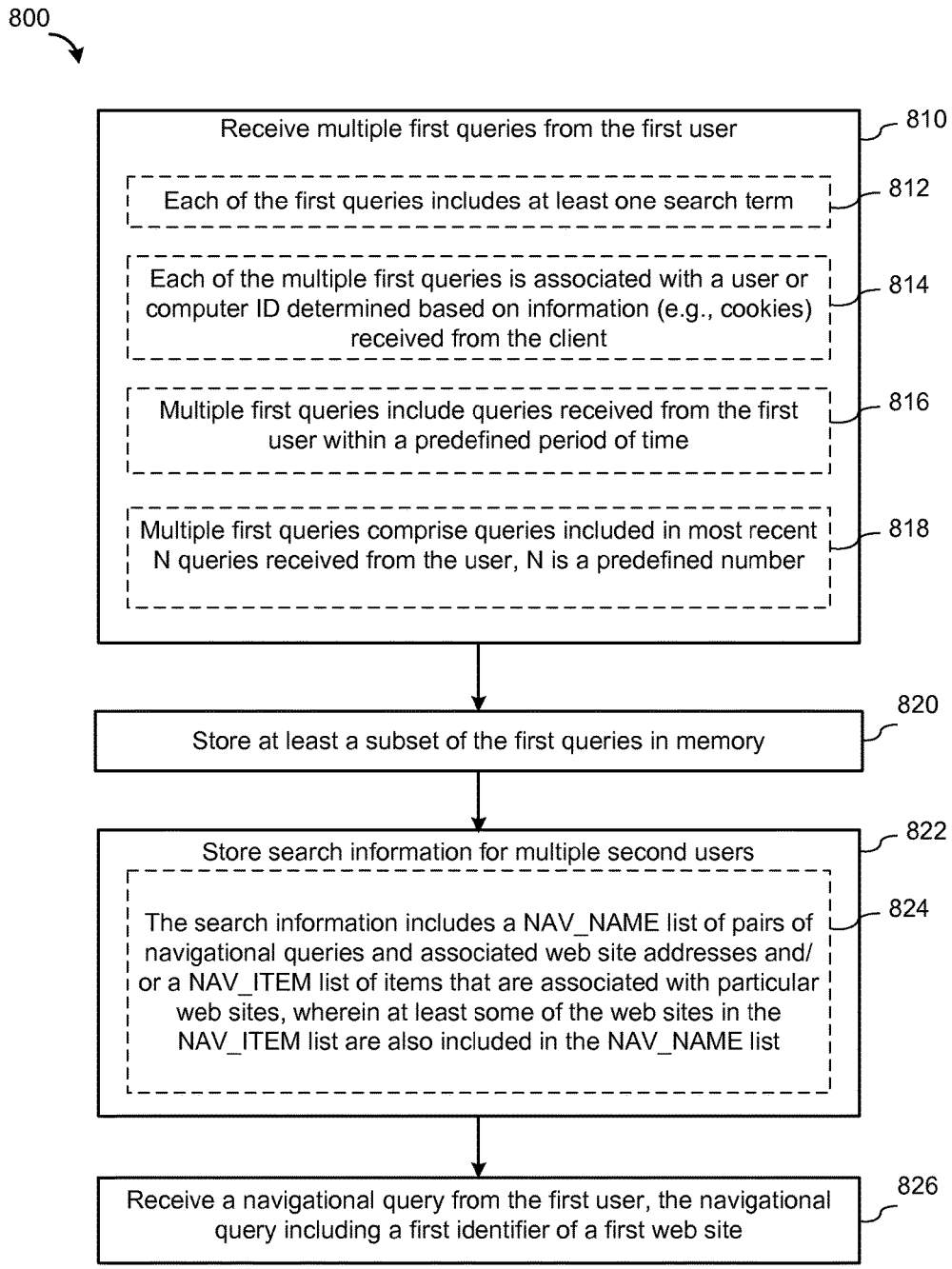
FIGS. 8A and 8B are flowcharts of a method for using recent search queries for inserting relevant search results for navigational queries, according to some embodiments.
Figure 8B:
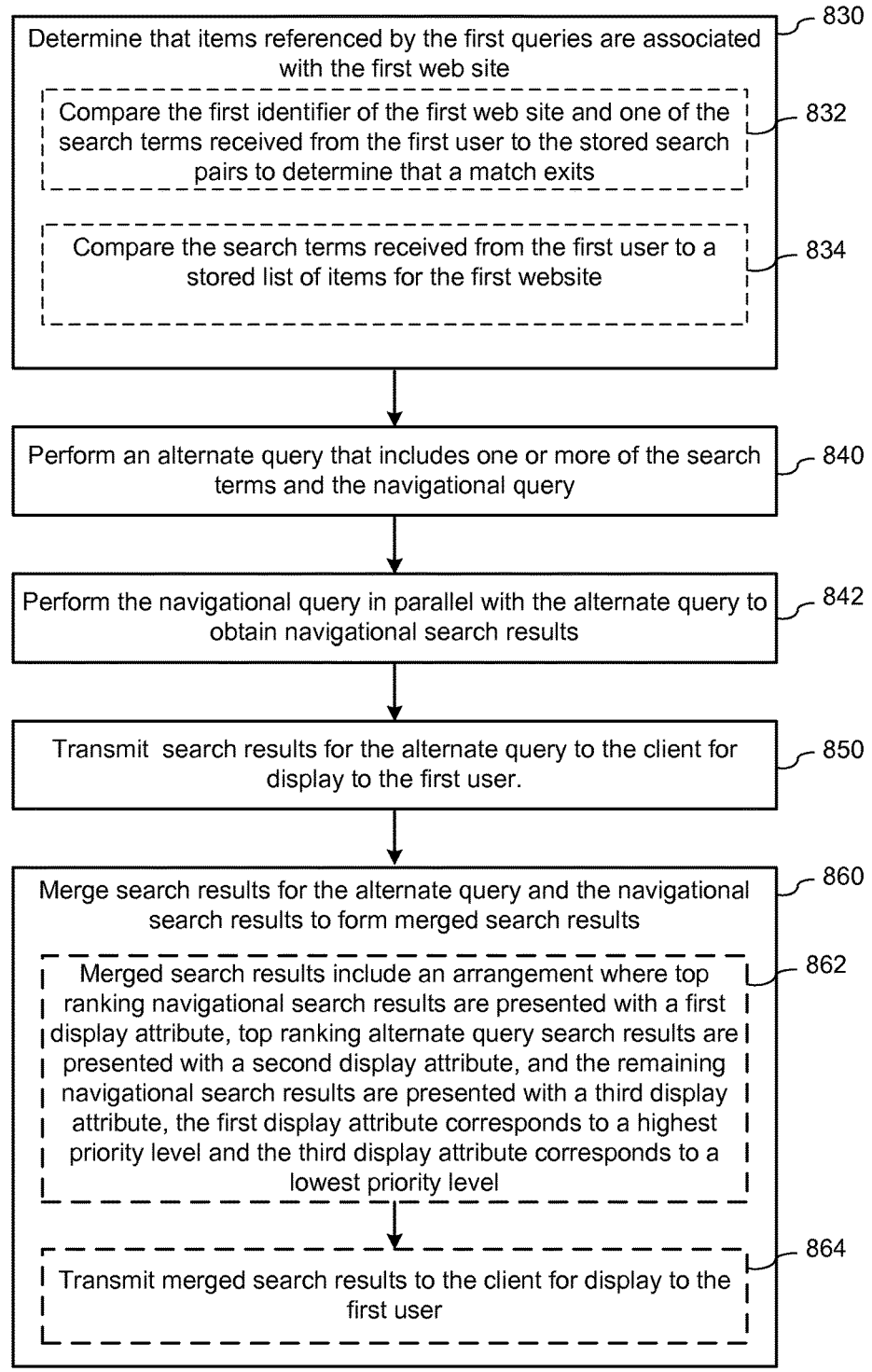

FIGS. 8A and 8B are flowcharts of a method 800 for using recent search queries for inserting relevant search results for navigational queries, according to some embodiments. The method 800 may be implemented by a standalone computer or the server 102 of FIG. 6. The method 800, as described below relates to a number of operations performed at server 102 to predict a user's next step, based on recent search queries entered by the user (e.g., a first user), after the user enters a navigational search query 106 (FIG. 1) in a search window 112 (FIG. 1) of a web browser or other client application.

In some embodiments (810), the server 102 receives one or more search queries from a first user. Multiple search queries may be received from the client 100 (FIG. 7), where the first user has entered the multiple search queries in an online session (FIG. 1). Each of the search queries (e.g., first queries) includes (812) at least one search term. For example, each search query includes a string that can form a logical function of search terms. The logical function may include logical operators such as "AND," "OR," "NOT," and the like.

In some embodiments (814), each of the first search queries is associated with a user identifier (ID). The user ID may be determined by the server 102 based on user or computer information, such as a cookie, associated with the online session of the first user. The user or computer information is sent by the web browser to the server 102. The user or computer information may include a user ID 310 (FIG. 3) and/or a session identifier (e.g., session-ID 302, FIG. 3).

In some embodiments (816), the one or more first search queries include "recent" queries received by the server 102 from the first user. The recent queries may, for example, be the queries received from the user within a predefined period of time. In some embodiments, the predefined period of time is referenced to a time stamp (e.g., the time stamp 330, FIG. 3) associated with the server's receipt of the navigational query. The predefined period may include the last few minutes (such as the last 10-30 minutes) or the last few days, depending on the nature of the search queries. For example, if the search queries include search terms such as names of items, for example, books, then the predefined period may be considered to be the last few minutes or hours. However, when the search term relates to long term planning, for instance, such as a name of a vacation destination (e.g., Hawaii), a longer time period such as the last few days may also be acceptable.

In some embodiments (818), the one more first search queries correspond to the most recent N queries (or a subset thereof) received by the server 102 from the first user, wherein the most recent queries are determined with respect to a time stamp (e.g., the time stamp 330, FIG. 3) associated with receipt by the server 102 of the navigational query from the user. In some embodiments, the number N is a predefined number such as 5 or 10. Other measures for determining which of a user's multiple queries are recent queries, or, alternatively, determining session boundaries (where a session includes the recent search queries that can possibly be combined with a subsequent navigational search query) include:

- A defined time gap between consecutive queries/clicks (where a short time gap implies that consecutive queries/clicks are related);
- Edit distance between consecutive queries/clicks (where a small edit distance implies that consecutive queries/clicks are related);
- Common words that appear in consecutive queries (where more commonality implies that consecutive queries are more likely to be related); and
- Query topic (using a query classifier, consecutive queries on the same or similar topics are more likely to be related).

These measures can be evaluated by a client employed 100 by the user to conduct searches and then returned to the server 102, or can be evaluated by the server 102 in response to information on user search activity returned by the client 100. In addition, these measures can be used independently, or any number of these measures can be combined, to identify a group of queries that are considered to be recent queries. For example, some embodiments employ for this purpose a combination of the measures as follows:

- Use no more than the 4 past queries;
- Ignore any queries older than 30 minutes; and
- Compute the time-gap between queries, which equals the time between the last click on a former query to the entry of a later query. In computing the session boundaries ignore past queries if there is a time gap larger than ten minutes between them and the current query.

In some embodiments (820), the server 102 stores at least a subset of the search queries from the first user in a search database 120. In some embodiments, the server 102, also stores (822) search information derived from other users (e.g., one or more second users). In some embodiments (824), the search information from the other users includes pairs of navigational search terms and associated web site addresses, which are stored in a Nav_Name list 244 (FIGS. 2, 4). In some embodiments (824) the search information from the other uses also includes a list of items/search terms associated with particular web sites, which are stored in a Nav_Item list 246, including in some embodiments the web sites included in the Nav_Name list 244. In some embodiments, the server derives the information in the lists 244, 246 from global search logs 238 that include information from searches conducted by multiple users.

In some embodiments (826), the server 102 receives a navigational query from the first user. The navigational query comprises a query that includes an identifier (e.g., the first identifier, such as a name) of a web site, such as the identifier, "google," corresponding to a first web site, "google.com".

In some embodiments (830), the determining module 618 (FIG. 6) may determine that some of the items referenced by the recent search queries are associated with the web site identified in the received navigational query or, putting it in a different way, that the search terms in some of the one or more first search queries have previously been selected, or clicked through, by another user from previous search results for the navigational query. The determining module 618 may, for example, compare the web site identifier included in a user's navigational query (e.g., web site identifier 410 of FIG. 4) and one or more search terms included in user's recent search queries to search pairs stored in the global history file 244 of search pairs to determine whether a match exists (832). Optionally, the determining module 618 may compare the items referenced by the recent queries, including the most recent N queries received from the user, to a stored list of items for the web site to determine whether the items are available from the web site (834). The list of the items for the web site may be obtained from the web sites catalogs 236 (FIGS. 2 and 5). When a match exits (i.e., the items are available from the web site), the determining module 618 notifies the execution module 616 of the existing match.

In some embodiments (840), the execution module 616 performs an alternate query that includes one or more of the search terms included in the recent search queries, and the navigational query, both received by the server 102 from the user. In some embodiments (842), the execution module 616 performs the navigational query in parallel with the alternate query to obtain navigational results as well as alternate results.

Subsequently (850), the server 102 transmits the search results for the alternate query and the navigational query to the client 100 for display to the user. In some embodiments, the server 102 merges the search results for the alternate query and the navigational search results to form merged search results (860). Subsequently (862), the merged search results include an arrangement where different portions of the search results are presented with different priority attributes. For example, top ranking navigational search results are presented with a first priority attribute, top ranking alternate query search results are presented with a second priority attribute, and the remaining navigational search results are presented with a third priority attribute. The first priority attribute corresponds to a highest priority level and the third priority attribute corresponds to a lowest priority level. The server 102 transmits the merged results to the client 100 for display to the user (864).

In some embodiments, the top ranking search results (e.g., top ranking navigational search results or top ranking alternate query search results) are defined as the search results that have received historically the top N percent of clicks from various users, where N is a predefined number (e.g., a value between 60-100, such as 90). The remaining navigational search results, for example, are the navigational search results other than the top ranking navigational search results. However, any navigational search result that receives less than L percent of the clicks is not displayed as part of the remaining navigational search results, where L is a predefined number (e.g., less than 20, such as 5). The number of clicks referred to herein corresponds to the historical number of received clicks for each search result as stored in the global search logs.

Figure 9A:
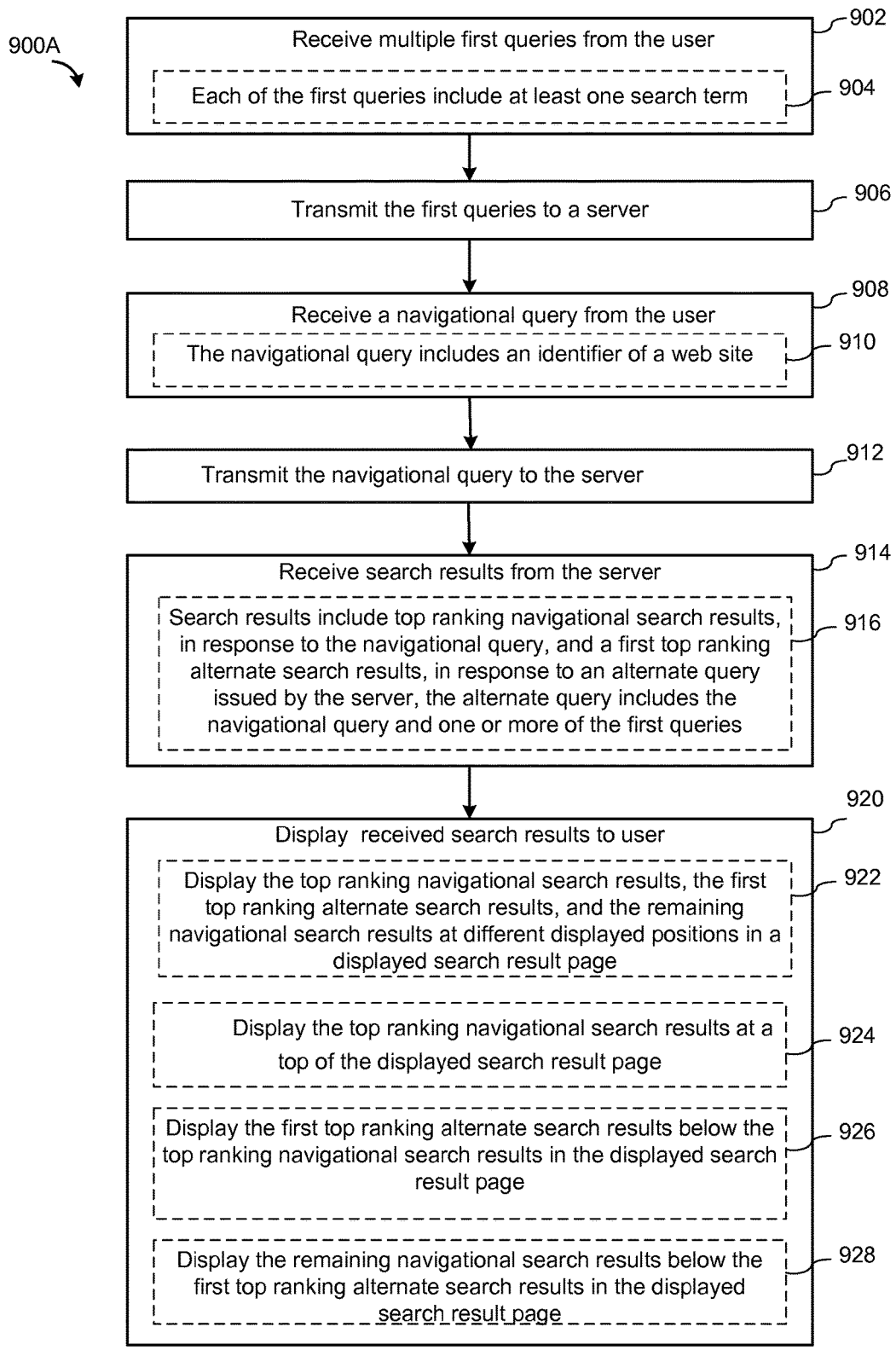
FIGS. 9A and 9B are flowcharts of a method for displaying relevant search results for navigational queries based on recent search queries, according to some embodiments.
Figure 9B:
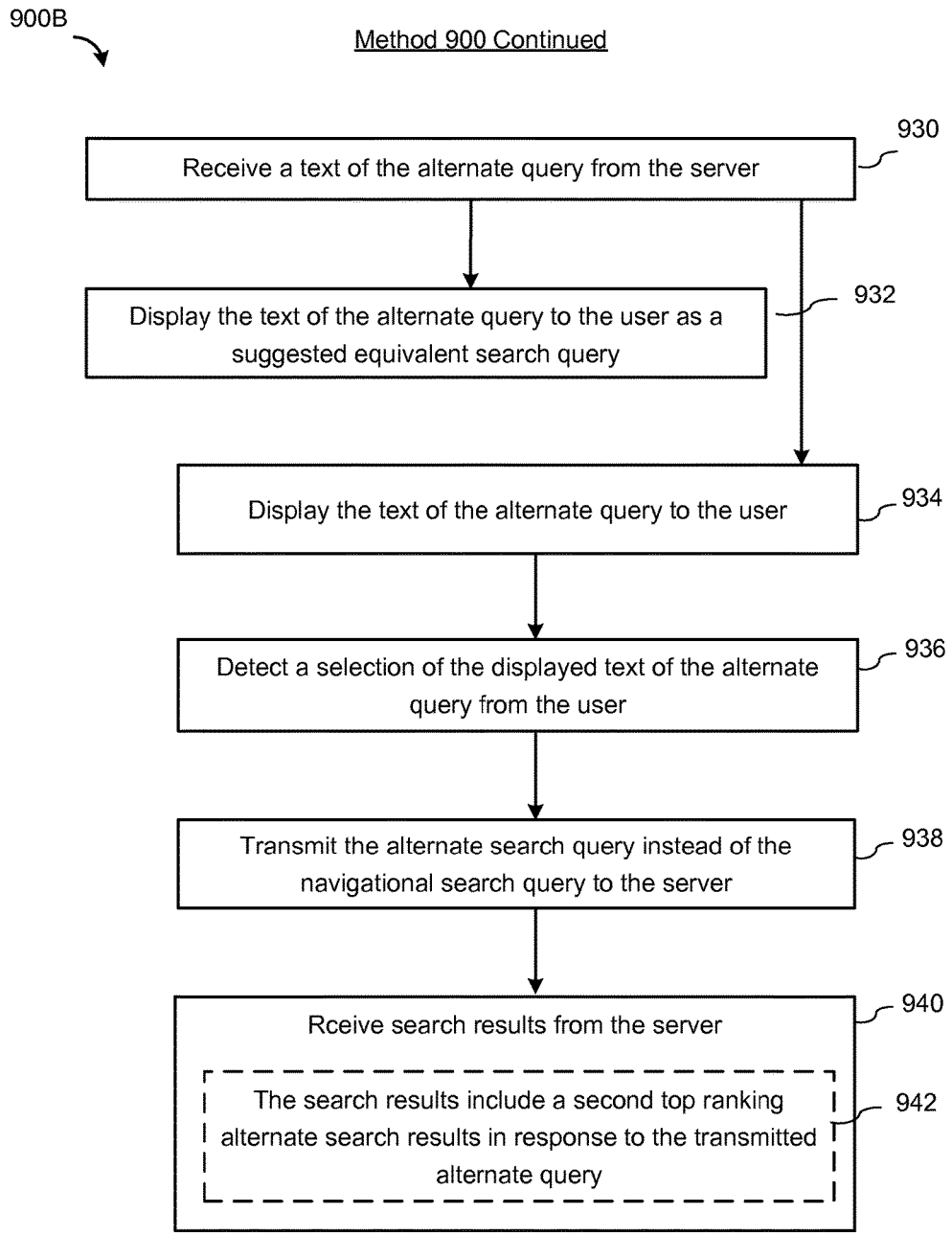

FIG. 9 is a flowchart of a method 900 for displaying relevant search results for navigational queries based on recent search queries, according to some embodiments. The method 900 may be implemented by a standalone computer or the client 100 of FIG. 7. The method 900, as described below, relates to a number of operations performed at the client 100 to display search results received from the server 102 (FIG. 6) in response to search queries received from users (e.g., a first and a second user) and transmitted to the server 102, as described herein.

The client 100 receives multiple queries (e.g., first queries) from the user (902). Each of the queries includes one or more search terms (904). The client 100 transmits the queries to the server 102 (906). Subsequently (908), the client 100 receives a navigational query from the user. The navigational query includes an identifier (e.g., the web site identifier 410 of FIG. 4, such as a web site name) (910). The client 100 then transmits (912) the navigational query to the server 102. In response, the client 100 receives (914) search results from the server 102. The search results include (916) top ranking navigational search results, in response to the navigational query, and a first top ranking alternate search results in response to an alternate query performed by the server. The alternate query includes the navigational query and the multiple queries.

The user interface module 716 (FIG. 7) displays (920) received search results to the user. In some embodiments (922), the user interface module 716 displays different portions of the search results, for example, the top ranking navigational search results, the first top ranking alternate search results, and the remaining navigational search results at different displayed positions in a displayed search result page. The displayed position for each portion of the search results depends on the priority attribute of that portion as presented by the server 102 and described above with respect to FIG. 8.

In some embodiments (924), the top ranking navigational search results portion that is presented with the first priority attribute indicating the highest priority are displayed at the top of the displayed search result page (display position 142, FIG. 1).

In some embodiments (926), the first top ranking alternate search results portion that is presented with the second priority attribute are displayed below the top ranking navigational search (display position 144, FIG. 1).

In some embodiments (928), the remaining navigational search results portion that is presented with the third priority attribute are displayed below the first top ranking alternate search results portion (display position 146, FIG. 1).

In some embodiments, different displayed positions 142, 144, and 146 are displayed with different display attributes (e.g., color, shading, font size, font type, and the like).

In some embodiments (930), the client 100 may receive a text of the alternate query from the server 102. Subsequently (932), the client 100 may display the text of the alternate query to the user as a suggested equivalent search query. Alternatively, the client 100 displays (934) the text of the alternate query to the user and detects (936) a selection of the displayed text of the alternate query from the user. The user may select the displayed text of the alternate query by, for example, a click or mouse over action, which is detected by the operating system 712 of the client 100 (FIG. 7). In some embodiments (938), the client 100 transmits the alternate search query instead of the navigational search query to the server 102 (FIG. 6). Subsequently (940), the client 100, in response to transmitting the alternate search query, receives search results from the server 102. The search results include a second top ranking alternate search results in response to the transmitted alternate query (942). The client 100, subsequently, displays the search results in different displayed positions as discussed above (922-928).

Some embodiments can employ additional techniques for presenting/displaying the prediction of a Nav_Item that a user is looking for (i.e., beyond injecting the results of an alternative query into search results presented to the user as described above). These additional techniques include:

Presenting the predicted Nav_Item results when suggesting queries (e.g., in Google Suggest, as the user enters the query);

Instead of displaying the alternate query, showing it to the user as a link; and Displaying the results of the alternative query in a separate area of the screen from the conventional search results. Possible alternative areas of the screen that can be employed for this purpose include:

At the bottom of the screen;

In a side bar of the screen;

In a different tab of the browser (where selecting the tab will cause the results for the alternative Nav_Item search to be displayed); and In a user interface dialog that pops up when the user hovers above some text.

In this way, embodiments described herein save a user's time and effort by predicting searches that the user is likely to make based on a history of the user's recent searches (including general searches—e.g., for items that can be purchased from online retailers—and a navigational query) and, in some instances, global search information from which the server is able to identify navigational queries entered by the user and to determine whether the items recently searched for by the user are available from the site corresponding to the navigational search. Also, because the server performs multiple searches nearly simultaneously, including the navigational query input by the user and an alternate search based on recent search terms (restricted to the site corresponding to the navigational query), the user is able to either select from displayed, merged results a result associated with the recent navigational query or one of the alternate results, therefore saving time that would otherwise be required to re-enter search terms on a particular web site.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method comprising:
at a server having one or more processors and memory storing programs executable by the processors,
receiving from a first user a query for one or more items of interest, the query including at least one search term;
obtaining and storing results responsive to the query;
after obtaining and storing the results responsive to the query:
receiving from the first user a separate navigational query for a first website, wherein the navigational query includes a first identifier of the first web site, and wherein the at least one search term is absent from the navigational query; and
in response to receiving the navigational query, when the query is a recent query, obtaining the at least one search term from the recent query and executing an alternate query of the first web site to yield alternate search results responsive to the alternate query within a domain of the first website, the alternate query including the at least one search term and the navigational query; and
formatting for display and transmitting to the first user the alternate search results, at least one top ranking navigational search result, and at least one remaining navigational search result, wherein the at least one top ranking navigational search result, the alternate search results, and the at least one remaining navigational search result are associated with a priority attribute that indicates a priority level for display,
wherein a first priority attribute is associated with the at least one top ranking navigational search result and indicates that the at least one top ranking navigational search result is to be displayed above other search results displayed on a search result page, a second priority attribute is associated with the alternate query search result and indicates that the alternate query search result is to be displayed below the at least one top ranking navigational search result in the search result page, and a third priority attribute is associated with the at least one remaining navigational search result and indicates that the at least one remaining navigational search result is to be displayed below the alternate query search result in the search result page, the first priority attribute having a highest priority level and the third priority attribute having a lowest priority level.

2. The method of claim 1, further comprising:
obtaining search information for a plurality of second users, the search information including a plurality of search pairs, each search pair including a second identifier of a second web site and an identifier of an item associated with the second web site,
comparing the first identifier of the first web site and the at least one search term with the stored search pairs to determine that a match exits.

3. The method of claim 1, further comprising:
performing the navigational query to obtain navigational search results;
merging the search results for the alternate query and the navigational search results to form merged search results; and
transmitting the merged search results to the client for display to the first user.

4. The method of claim 3, wherein the merged search results include an arrangement where the at least one top ranking navigational search result is presented with the first priority attribute, the alternate query search result is presented with the second priority attribute, and the at least one remaining navigational search result is presented with the third priority attribute.

5. The method of claim 1, further comprising,
prior to performing the alternative query,
confirming that a second user has previously selected results associated with the at least one search term from the recent query, wherein the previously selected results are associated with the first website.

6. The method of claim 1, wherein the search results for the alternate query further include a search result in the search results for the recent query.

7. The method of claim 1, wherein the recent query comprises a first recent query, the method further comprising receiving a plurality of recent queries, including the first recent query, from the first user within a predefined period of time.

8. The method of claim 1, further comprising receiving a plurality of the recent queries included in most recent N queries received from the user, wherein N is a predefined number.

9. The method of claim 1, further comprising, prior to performing the alternate query, comparing the at least one search term with a list of items for the first web site to determine that items referenced by the search terms are associated with the first web site.

10. The method of claim 1, wherein the recent query and the navigational query are queries received within a same browsing session.

11. The method of claim 1, wherein the one or more items of interest are goods or services.

12. The method of claim 1, wherein the at least one search term is not present in the navigational query.

13. The method of claim 11, wherein the first website is an e-commerce web site, and the one or more goods or services can be purchased or sold at the first web site.

14. The method of claim 1, wherein the navigational query is based on text received from the user.

15. The method of claim 1, wherein:
the at least one search term corresponds to a most recent query, wherein the most recent query is determined with respect to a time stamp associated with a server of the navigational query from the user.

16. The method of claim 1, wherein the at least one top ranking navigational search result, the alternate query search result, and the at least one remaining navigational search result are formatted for concurrent display on the search result page.

17. A system for providing search results to a first user of a client, the system comprising:
one or more processors;
memory coupled to the processor, the memory storing program modules executable by the processors, the program modules including:
a receiving module configured to receive a first query for one or more items of interest and a navigational query for a first website, wherein the first query includes at least one search term, and wherein the navigational query includes a first identifier of the first web site, and the at least one search term is absent from the navigational query;

an execution module configured to:
  obtain and store results responsive to the first query prior to receiving the navigation query, wherein the first query is a recent query of the navigation query,
  after obtaining and storing the results responsive to the recent query, in response to receiving the navigational query, obtain the at least one search term from the recent query, and
  execute an alternate query of the first web site to yield alternate search results responsive to the alternate query within a domain of the first website, the alternate query including the at least one search term and the navigational query; and a transmitting module configured to transmit to the first user the alternate search results, at least one top ranking navigational search result, and at least one remaining navigational search result for display, wherein the at least one top ranking navigational search result, the alternate search results, and the at least one remaining navigational search result are associated with a priority attribute that indicates a priority level for display, wherein a first priority attribute is associated with the at least one top ranking navigational search result and indicates that the at least one top ranking navigational search result is to be displayed above other search results displayed on a search result page, a second priority attribute is associated with the alternate query search result and indicates that the alternate query search result is to be displayed below the at least one top ranking navigational search result in the search result page, and a third priority attribute is associated with the at least one remaining navigational search result and indicates that the at least one remaining navigational search result is to be displayed below the alternate query search result in the search result page, the first priority attribute having a highest priority level and the third priority attribute having a lowest priority level.

18. The system of claim 17, further comprising:
a second database configured to obtain search information for a plurality of second users, the search information including a plurality of search pairs, each search pair including a second identifier of a second web site and an identifier of an item associated with the second web site; and
a determining module configured to compare the first identifier of the first web site and the at least one search term with the stored search pairs to determine that a match exits and notify the execution module of the existing match.

19. The system of claim 17, wherein the determining module is further configured to:
compare the at least one search term with a stored list of items for the first web site; and
when there is a match, notify the execution module of the existing match.

20. The system of claim 17, wherein the execution module is further configured to:
perform the navigational query in parallel with the alternate query to receive navigational search results; and
receive the navigational search results for the navigational query.

21. The system of claim 17, further comprising:
a merging module configured to merge the search results for the alternate query and the navigational search results to form merged search results;
wherein the transmitting module is further configured to transmit the merged search results to the client for display to the first user.

22. The system of claim 21, wherein the merging module is further configured to arrange the merged search results such that
the at least one top ranking navigational search result is presented with the first priority attribute,
the alternate query search result is presented with the second priority attribute, and
the at least one remaining navigational search result is presented with the third priority attribute.

23. The system of claim 17, wherein the search results for the alternate query further include a search result in the search results for the recent query.

24. The system of claim 17, further comprising:
a determining module configured to confirm, prior to execution of the alternative query by the execution module, that a second user has previously selected the items when they have been returned in prior search results for the navigational query.

25. The system of claim 17, wherein:
the at least one search term corresponds to a most recent query, wherein the most recent query is determined with respect to a time stamp associated with a server of the navigational query from the user.

26. The system of claim 17, wherein the at least one top ranking navigational search result, the alternate query search result, and the at least one remaining navigational search result are formatted for concurrent display on the search result page.

* * * * *